Figure 4:
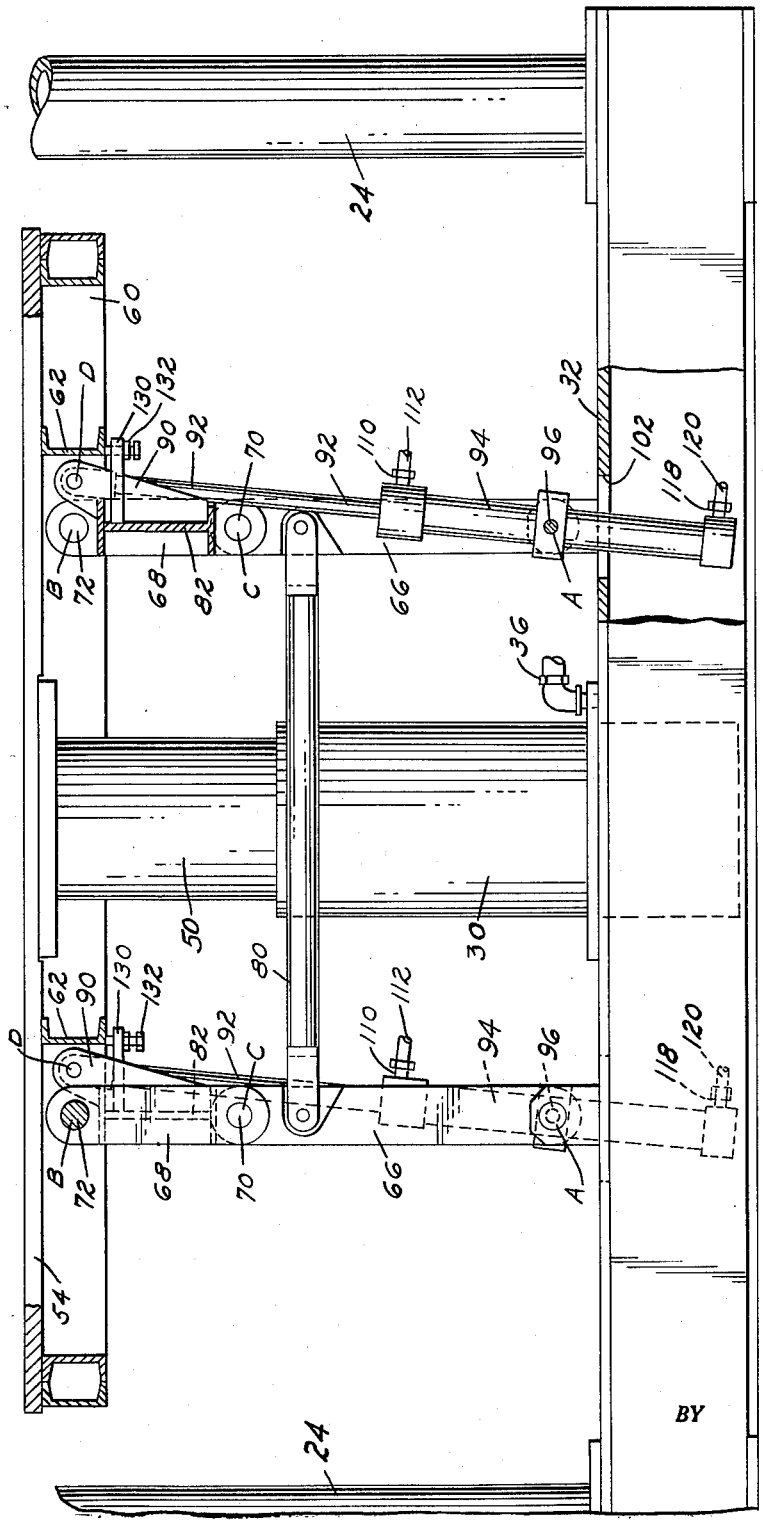

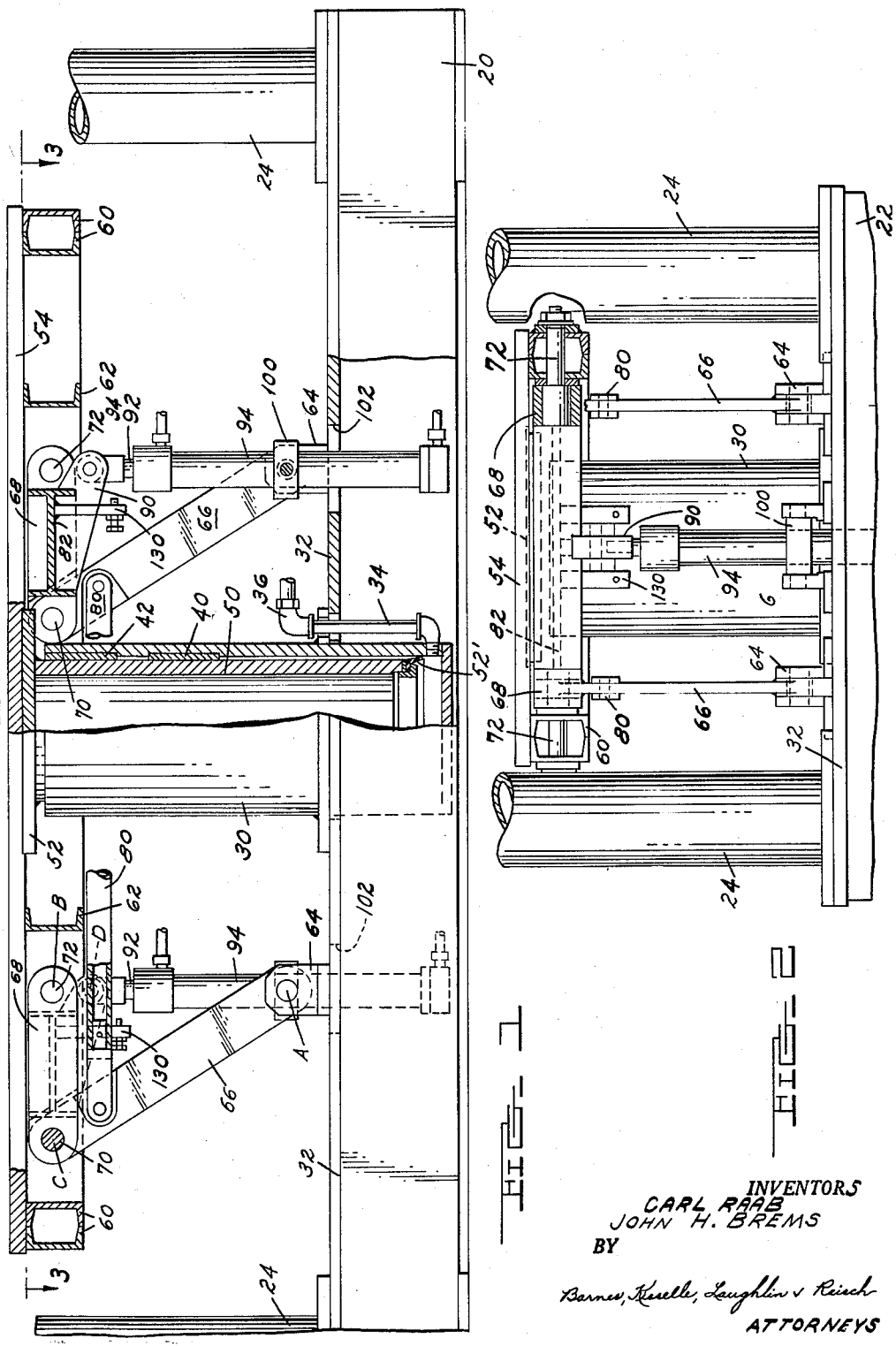

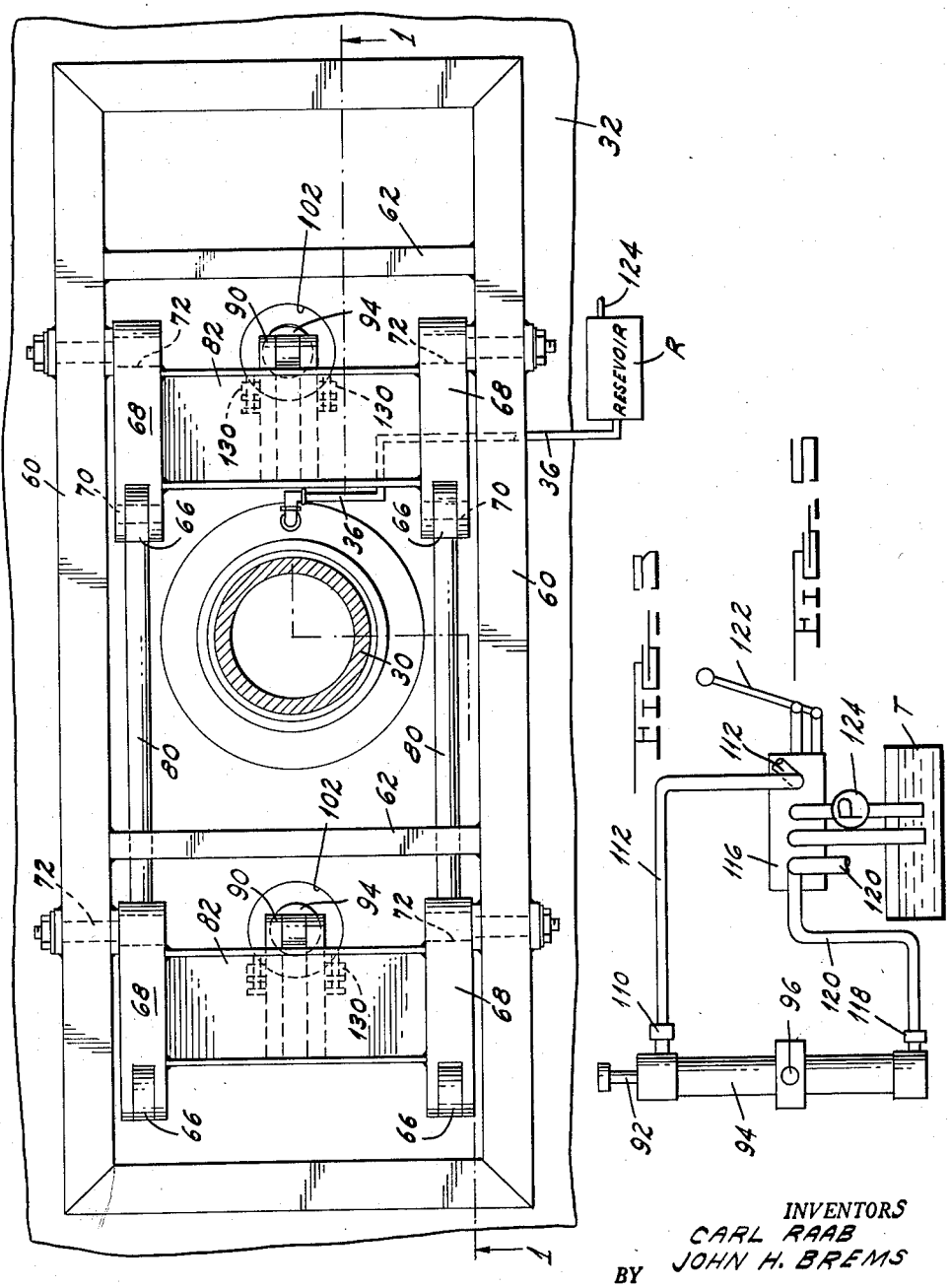

Oct. 4, 1960

C. RAAB ET AL 2,954,847

PRESS TABLE

Filed Nov. 28, 1955

3 Sheets-Sheet 3

INVENTORS
CARL RAAB
JOHN H. BREMS
BY
Barnes, Kisselle, Laughlin & Raisch
ATTORNEYS

United States Patent Office 2,954,847
Patented Oct. 4, 1960

2,954,847
PRESS TABLE

Carl Raab and John H. Brems, Detroit, Mich., assignors to Expert Die & Tool Company, Inc., Detroit, Mich., a corporation of Michigan Filed Nov. 28, 1955, Ser. No. 549,264

8 Claims. (Cl. 187—17)

This invention relates to a press table and more particularly to a mechanism for providing an up and down motion for a press plate or welder plate where it is necessary to move a part into position for welding or any other operation.

One of the problems in connection with this type of apparatus is the necessity for locking the device at the top of its stroke and also the necessity for having a positive limit to the motion. In connection with pneumatic or hydraulic operation in the absence of a locking device, it is necessary to maintain an extremely high pressure during the pressing operation or other operation which takes place on the table after it is raised.

The present invention contemplates a self-locking device which may be pneumatically operated and one which is mechanically controlled in a simple and yet extremely rugged construction.

Briefly, the invention consists of a base frame and a table to move vertically upward to a defined position. The table is supported by a guide piston and plunger which may also be utilized to limit the descent motion, and it is actuated upwardly by a plurality of supports positioned around the central guide, each support including the combination of a link and piston cylinder associated in a manner to obtain rapid and positive upward stroke together with locking and ready release.

Drawings accompany the disclosure, and the various views thereof may be briefly described as follows:

Figure 1, a side elevation with portions in section showing the table in collapsed position.

Figure 2, an end elevation of the device as viewed in Figure 1.

Figure 3, a sectional view on line 3—3 of Figure 1 showing the relationship of the parts.

Figure 4, a view similar to Figure 1 showing the press in up position.

Figure 5, a diagrammatic view of the hydraulic circuit.

Referring to the drawings, the machine in question is shown with a bottom frame having side beams 20 and end beams 22. On the frame are vertical columns 24 which may be used to support the structure of the machine either in the form of a press or welding machine and the like. Centrally of the frame and vertically disposed is a cylinder 30, suitably supported in the frame by a plate member 32 spanning the frame members. The bottom of the cylinder 30 is connected by a pipe 34 having an outlet connection 36 which may be used as a dash pot control or for the introduction of pressure to facilitate lifting of the table.

Wear and guide rings 40 and 42 are provided in the cylinder 30 for a plunger 50, which is provided with a sealing ring 52 at the bottom edge thereof. The upper end of the plunger 50 is capped by a plate 52 which lies underneath a top plate 54 forming the table which is to be raised. The table 54 is reinforced by a double U-beam member 60 around the edge thereof also by additional U-plate cross members 62. On the supporting plate 32 are mounted four bifurcate brackets 64, in each of which is pivoted a straight link 66 which extends upwardly in length a distance about two-thirds of the total distance between the bracket and the uppermost position of the plate. These links 66 are connected to the frame 60 of the table by four straight links 68 pivoted at 70 to form an elbow or knee joint and connected to the frame 60 by wrist pins 72.

Toggle links 66 are joined by stabilizer bars 80 to insure parallelogram motion of the links 66. Toggle links 68 are connected by an I-beam stringer member 82 transversely of the machine to form a toggle element, shown best in Figure 3. Centrally of the I-beam member 82 is a finger bracket 90, which, as viewed in Figure 4, extends upwardly and to one side of the I-beams 82 terminating above the I-beams at a point which is substantially horizontal with the center of the wrist pin 72. Pivotally connected to these finger brackets 90 is a piston rod 92 which extends downwardly into a pivoted cylinder 94 pivoted at 96 in a trunnion 100 (see Figure 2). The cylinder 94, swingable on the trunnion 100, projects through a hole 102 in the base plate 32.

Cylinders 94 are double-acting cylinders having a connection at each end leading to a valve, for example, as shown in Figure 5, where cylinder 94 has an upper connection 110 leading through a hose 112 to a four-way valve 116 and a lower connection 118 leading through a hose 120 to the valve 116. The valve shown is manually operated by a lever 122, but it may also be an automatic valve or solenoid operated as desired. A pump 124 forms a pressure source for liquid stored in tank T.

The outlet connection 36 for the cylinder piston combination 30—50 is preferably connected to a counterbalance reservoir R in which, through a connection 124, a predetermined pressure may be maintained to counterbalance the action of the table up and down. The cylinder piston combination 30—50 is the main source of lateral stability for the table.

On the stringer members 82 are short arms 130 having adjustment screws 132 (Figure 4) which contact the screw member 62 when the table is in upright position (Figure 4). These adjustment screws, which are provided with lock nuts, are designed to permit a stop arrangement for the parts so that the links 66 and 68 may go slightly overcenter as the table reaches its uppermost position.

It will be noted further that the shaft point 96 of the cylinders 94 is coincident and coaxial with the lower shaft points of the links 66, and these pivot points are directly in line vertically with the shaft points 72 on the table. Thus, there is always a straight, upward thrust on the table and no tendency for side motion.

In the operation of the device, it will be seen that a suitable pressure may be introduced into the reservoir R, said pressure being insufficient to elevate the table but sufficient to relieve the operating and working cylinders of lifting the entire weight. When it is desired to lift the table, valve handle 122 is shifted to direct pressure from pump 124 to the lower end of the cylinders 94, urging the piston rods 92 upwardly and presenting a direct upward thrust on the table through the finger brackets 90, all parts being aligned at this point as shown in Figure 1.

As the table moves upwardly, the knee joint 70 will move to the right, as viewed in the drawings, and the cylinders 94 will swing slightly, as shown in Figure 4. As the knee joint straightens out and goes slightly overcenter, the parts will be positioned, as shown in Figure 4. In this relationship, the table is locked in position and any downward force thereon will be counteracted by the mechanical knee joint itself. Furthermore, at this point it is not necessary to maintain a high holding pressure in the cylinders 94 since a low holding pressure is sufficient merely to keep the links in their locked position.

When it is desired to lower the table, valve handle 122 is shifted to direct pressure to the top of the cylinders 94 through flexible conduit 112. This will kick the knees into the collapsed position and allow the table to fall by its own weight, liquid in the bottom of the cylinders passing to the tank through the conduits 120.

As viewed in Figures 1 and 4, the lower pivot points of the toggle legs are at A and the upper pivot points are at B. The knee joint pivots at C, and the force point for the expandable means 92—94 is at D. In Figure 1, the table down position, the point D is directly below the point B. As the table rises, point D swings in an arc to the position shown in Figure 4. Meanwhile, the adjustment stop 130—132 is set so that knee point C, in raised position, will fall between a plane through points A and B and a plane through points A and D (Figure 4). Thus, when action is reversed a downward pull at point D will kick the point C over center into collapsing position.

We claim:

1. For use in a welding machine and the like, a table and means for raising and lowering the same to and from a work position, comprising a table element, means furnishing lateral support therefore in a vertical motion, spaced upper toggle links pivotally depending in parallel relation on said table element, a base member, lower toggle links connected respectively to said upper toggle links and to said base member, and expansible means pivotally connected to said base member on the axis of said lower toggle link connections of said base member and pivotally connected to said upper toggle links at a point spaced from said pivotal connection of said upper links with said table element to direct an upward force on said table element in the extending action of said links, and a collapsing action on said toggle links during the lowering motion of the table.

2. A force applicator for welding and machine tool tables and the like which comprises a table element, means to guide said table in a motion normal to its plane, a base member, first toggle links pivoted at one end at a first pivot point to said table element, second toggle means pivoted at one end at a second pivot point to said base member, said links being pivoted to each other at their other ends, expansible means pivotally associated with said base member on the axis of said second pivot point, said means being operably connected to said first link members at a point substantially in line with said first pivot point at the initiation of a stroke when the links are in a collapsed position and at points laterally and progressively spaced from the line between said first and second pivot points as the table elment moves away from the base.

3. A device as defined in claim 2 in which the guide means comprises a piston-cylinder combination in telescoping relation, and means to connect the combination to a force of pressure to provide an air counter-balance for said table.

4. A device as defined in claim 2 in which the toggle links are arranged in parallel pairs and said first toggle links connected to said first pivot point are connected by a lateral strut, and said expansible means is mounted on said base member and operably connected with said strut.

5. A device as defined in claim 4 in which said lateral strut is provided with a force bracket spaced to the side thereof, and said expansible means is connected thereto at a force point spaced from said first pivot point and movable in an arc originating below said first pivot point and terminating to one side of said first pivot point as said table moves away from said base.

6. A device as defined in claim 5 in which said expansible means comprises a piston-cylinder power unit, one element of which is pivoted on the axis joining said second pivot points and the other element is pivoted at said force point on said bracket.

7. A device as defined in claim 5 in which said expansible means comprises a piston-cylinder power unit in which the cylinder element is pivoted between its ends on the axis joining said second pivot points and the piston element is pivoted at said force point on said bracket.

8. A device as defined in claim 4 in which a selectively movable stop means is provided on said strut, and means is provided on said table to cooperate with said stop means to control the stopping point of said toggle links to a point between the plane passing through said first and second pivot points and the plane passing through the second pivot point and the point at which the expansible means is connected to said strut at the extremity of the motion of the table away from the base.

References Cited in the file of this patent

UNITED STATES PATENTS

| | | |
|---|---|---|
| 968,501 | Turner | Aug. 23, 1910 |
| 2,301,579 | Plant et al. | Nov. 10, 1942 |
| 2,385,115 | Stuart | Sept. 18, 1945 |
| 2,466,155 | Conrad | Apr. 5, 1949 |
| 2,471,901 | Ross | May 31, 1949 |
| 2,480,916 | Gibson | Sept. 6, 1949 |
| 2,614,800 | Garlinger et al. | Oct. 21, 1952 |
| 2,829,863 | Gibson | Apr. 8, 1958 |